POWER UNIT FOR FRICTION DRIVE HOSPITAL BED

Original Filed Dec. 5, 1968 4 Sheets-Sheet 1

Inventor
Francis J. Burst
By George H. Simmons
Att'y.

POWER UNIT FOR FRICTION DRIVE HOSPITAL BED

Original Filed Dec. 5, 1968 4 Sheets-Sheet 2

Inventor
Francis J. Burst
By George H. Simmons
Att'y.

POWER UNIT FOR FRICTION DRIVE HOSPITAL BED

Original Filed Dec. 5, 1968 4 Sheets-Sheet 3

Inventor
Francis J. Burst
By George H. Simmons
Att'y.

POWER UNIT FOR FRICTION DRIVE HOSPITAL BED

Original Filed Dec. 5, 1968 4 Sheets-Sheet 4

Inventor
Francis J. Burst
By George H. Simmons
Atty.

United States Patent Office

Re. 27,966
Reissued Apr. 9, 1974

27,966
POWER UNIT FOR FRICTION DRIVE HOSPITAL BED

Francis J. Burst, Batesville, Ind., assignor to Hill-Rom Company, Inc., Batesville, Ind.

Original No. 3,571,826, dated Mar. 23, 1971, Ser. No. 781,564, Dec. 5, 1968. Application for reissue Mar. 21, 1973, Ser. No. 343,463
Int. Cl. A61g *7/00, 7/06;* F16h *15/00*
U.S. Cl. 5—67 15 Claims

Matter enclosed in heavy brackets [ ] appears in the original patent but forms no part of this reissue specification; matter printed in italics indicates the additions made by reissue.

ABSTRACT OF THE DISCLOSURE

A friction drive power unit for an electric hi-low hospital bed which unit includes control means accessible to and operable by a patient in the bed to operate the bed in a desired manner. The unit includes an interlock which prevents simultaneous operation of the hi-low and spring moving mechanisms of the unit, and includes limit position control of these devices.

PRIOR ART

The present invention is an improvement upon my copending application, Ser. No. 685,421, filed Nov. 24, 1967, now U.S. Pat. No. 3,436,769 issued Apr. 8, 1969. In this prior application a friction drive hospital bed includes a lever pivotally mounted upon the foot end of the bed for selecting either the hi-low operating mechanism or the head section operating mechanism and operation of the selected mechanism is controlled by patient-operated switches that control the electrical circuit of the reversible electric motor that supplies power to the bed.

SUMMARY OF THE INVENTION

The present invention improves upon this prior art bed by providing a friction drive power unit which is controlled by a patient in the bed both as to the selection of which of the driving mechanisms is to be actuated and, simultaneously with this selection, operating an electrical switch which controls the circuit of the electric motor.

The power unit of the present invention consists of a self-contained power unit that can be assembled almost completely prior to being mounted in the framework of a hospital bed. The completion of the power unit after mounting in the framework involves only a minimum of readily performable operations. The power unit includes a driving wheel constantly frictionally engaging a pair of friction discs under predetermined pressure which pressure is adjustable. The unit contains a pair of clutch mechanism each associated with one of the friction discs and operable to establish a driving connection between that disc and an associated screw shaft. One of said screw shafts controls the hi-low operation of the bed and the other screw shaft controls the elevation of the head section of the spring frame of the bed.

Operation of the clutches to establish a driving connection is effected by levers accessible to and operable by a patient in the bed. Simultaneously with the operation of a clutch a switch is operated to close a circuit to a reversible electric motor to operate the connected screw in a direction corresponding to the direction the lever is operated by the patient. An interlock prevents simultaneous movement of the clutches into driving position.

Power is supplied to the power unit by a separately mounted reversible electric motor connected to the unit by a belt located within the cross channel at the foot end of the bed. The motor mount includes means for adjusting the tension on the belt. Should replacement of the belt become necessary, it can be done without disturbing the assembly of the power unit.

The present invention permits supplying an electrically driven hi-low bed at a cost sufficiently low to render the bed available for use in installations where the features of the more expensive automatic hospital beds cannot be justified such as, for instance, in self-care sections of hospitals and in nursing homes and convalescent homes.

The invention will be best understood from the detailed specification and claims which follow reference being had to the accompanying drawings in which a preferred embodiment of the invention is shown by way of example and in which:

Figure 1:
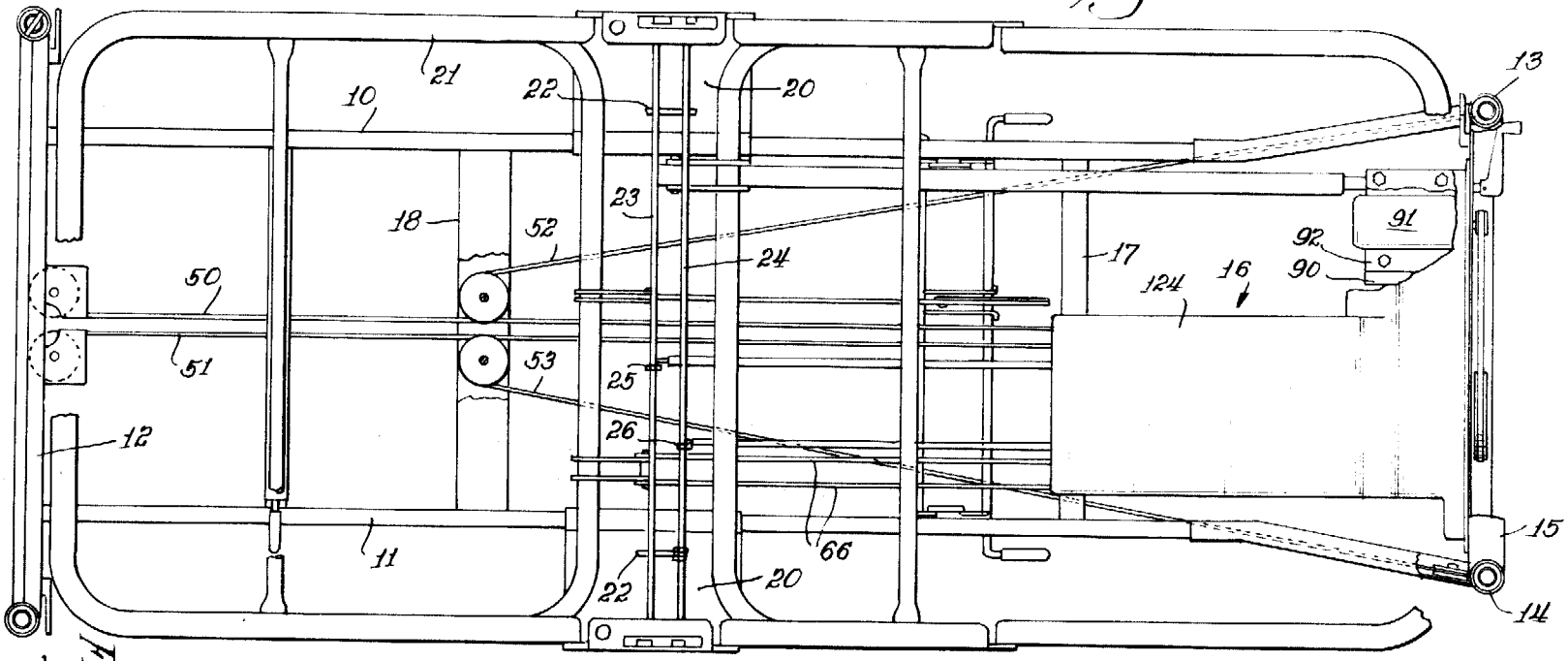
FIG. 1 is a plan view of the power unit installed in a hospital bed and with the dust covers in place.
Figure 2:
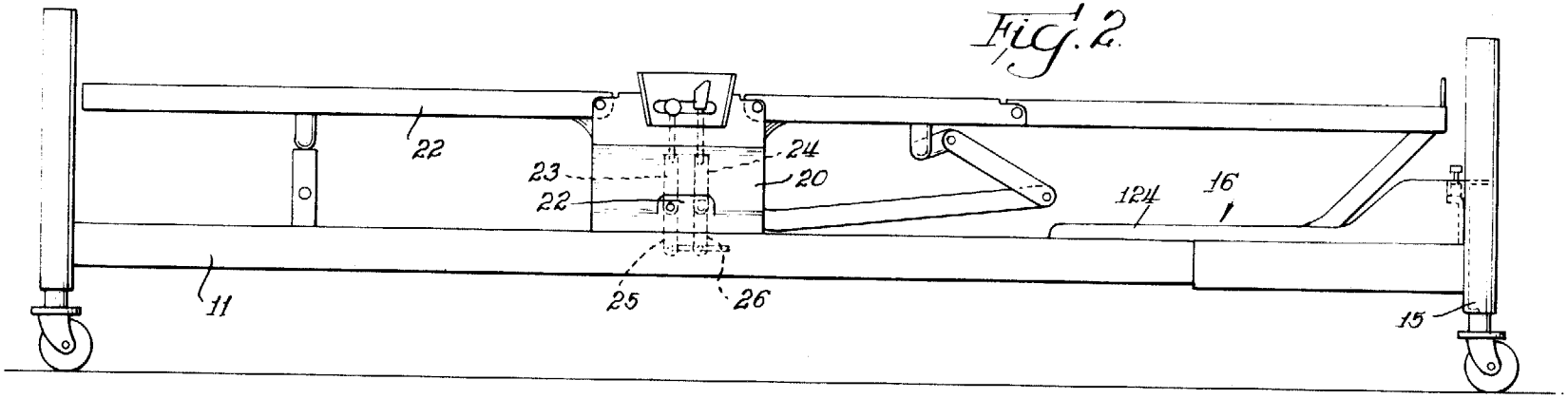
FIG. 2 is a side elevational view of the bed shown in FIG. 1.

As will be seen best in FIGS. 1 and 2, the hospital bed consists of side rails 10 and 11 which are attached to the cross channel 12 at the head end of the bed. Side rail 10 flares outwardly and is connected to a foot end post 13 and side rail 11 extends in a similar manner to a foot end post 14. Posts 13 and 14 are connected together by a foot end cross channel 15 to which the power unit of the present invention is mounted and indicated generally at 16.

The details of the hospital bed are not of the essence of the present invention and reference is here made to the above-mentioned copending application for an explanation of such details. It is sufficient to note herein that the spring frame of the bed includes a seat section 20 to which the head section 21 of the spring frame is pivotally connected. Journaled in suitable brackets 22 in the seat section are transverse control rods 23 and 24. Fixed upon control rod 23 and depending therefrom is a link 25 and affixed upon the control rod 24 is a similar link 26.

As will be seen best in FIGS. 4 to 8, inclusive, the power unit of the present invention consists of a framework indicated generally at 30 and consisting of a mounting bracket 31 having end flanges 32 from which are projected ears 33 which are pierced to permit attaching the bracket to the wed of the cross channel 15 in convenient manner such as by bolts 34.

Figure 6:
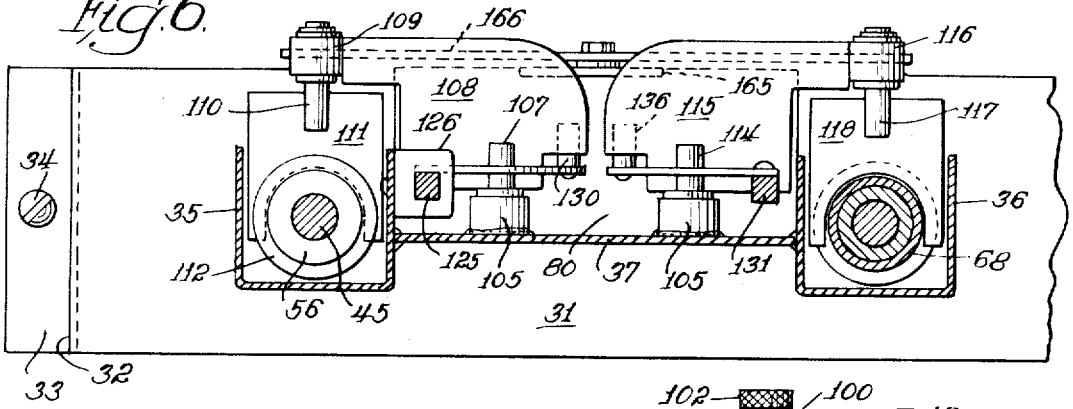
FIG. 6 is a cross-sectional view taken substantially along the line 66 of FIG. 4.

Fixed to the bracket 31 on the side thereof away from the channel 15 are screw channels 35 and 36 which from FIG. 6 will be seen to be rectangular in cross section and to have an open top. These channels are attached to the bracket in convenient manner such as by welding. Fixed between the channels 35 and 36 is a base plate 37 located adjacent the mounting bracket 31. Plate 37 is attached to the channels in convenient manner such as by welding. Also extending between the channels 35 and 36 and located adjacent the distal ends of these channels is a tie plate 38 which is attached to the channels in convenient manner such as by welding. Plate 38 contains a downwardly extending flange 39 which is attached to the flange of a crossmember 17 in convenient manner such as by bolts to complete the mounting of the framework 30 in the underframe of the bed.

A hi-low screw 45 is journaled in bearings 46 and 47 that are fixed in the channel 35. The hi-low nut 48 is threaded upon shaft 45 and two pair of cables 50 and 51 and 52 and 53 are associated with the nut 48 and attached thereto in known manner.

As will be seen in FIG. 1, cables 50 and 51 extend through suitable sheaves on the cross channel 12 at the head end of the bed to the legs telescoped in the posts at the head end of the bed and cables 52 and 53 extend around sheaves 54 supported in the crossmember 18 of the frame and thence to posts 13 and 14 respectively at the foot end of the bed to support the underframe and spring frame of the bed on the legs telescoped into the posts in known manner.

Mounted upon the shaft 45 is a clutch element 55 having a hub 56 that encircles the shaft and is prevented from rotation thereon by suitable means such as a pin fixed in the shaft and extending through a longitudinal slot in the hub. A friction disc shaft 57 is journaled in the channel 35 by a bearing 58 with the axis of the shaft 57 coinciding with the axis of the shaft 45. Shaft 57 carries diametrically opposed pins 59 for a purpose hereinafter to be explained. Shaft 57 projects through a perforation in the mounting bracket 31 and a friction disc 60 is fixed upon this shaft and positioned between the bracket 31 and the web of channel 15. A friction facing 16 is fixed upon the periphery of the disc 60.

The head screw 62 is journaled in suitable bearings 63 and 64 that are fixed in the screw channel 36 and a nut 65 is threaded upon this shaft. Links 66 connected to the nuts 65 are extended to the head section of the bed and function to elevate that head section as the nut 65 is moved away from the foot end of the bed.

The clutch element 67 is supported upon the shaft 62 by a hub 68 which is prevented from rotation upon the shaft by suitable means such as a pin carried by the shaft and projecting through an elongated slot in the hub.

A friction disc shaft 69 is journaled in a suitable bearing 70 that is fixed in the screw channel 36 which bearing supports the shaft with its axis coinciding with the axis of the shaft 62. Shaft 69 carries diametrically opposed pins 71. Shaft 69 projects through a perforation in the mounting bracket 31 and a friction disc 72 is fixed upon this shaft and positioned between the bracket 31 and the web of flange 15. A friction facing material 73 is attached to the disc 72.

Figure 4:
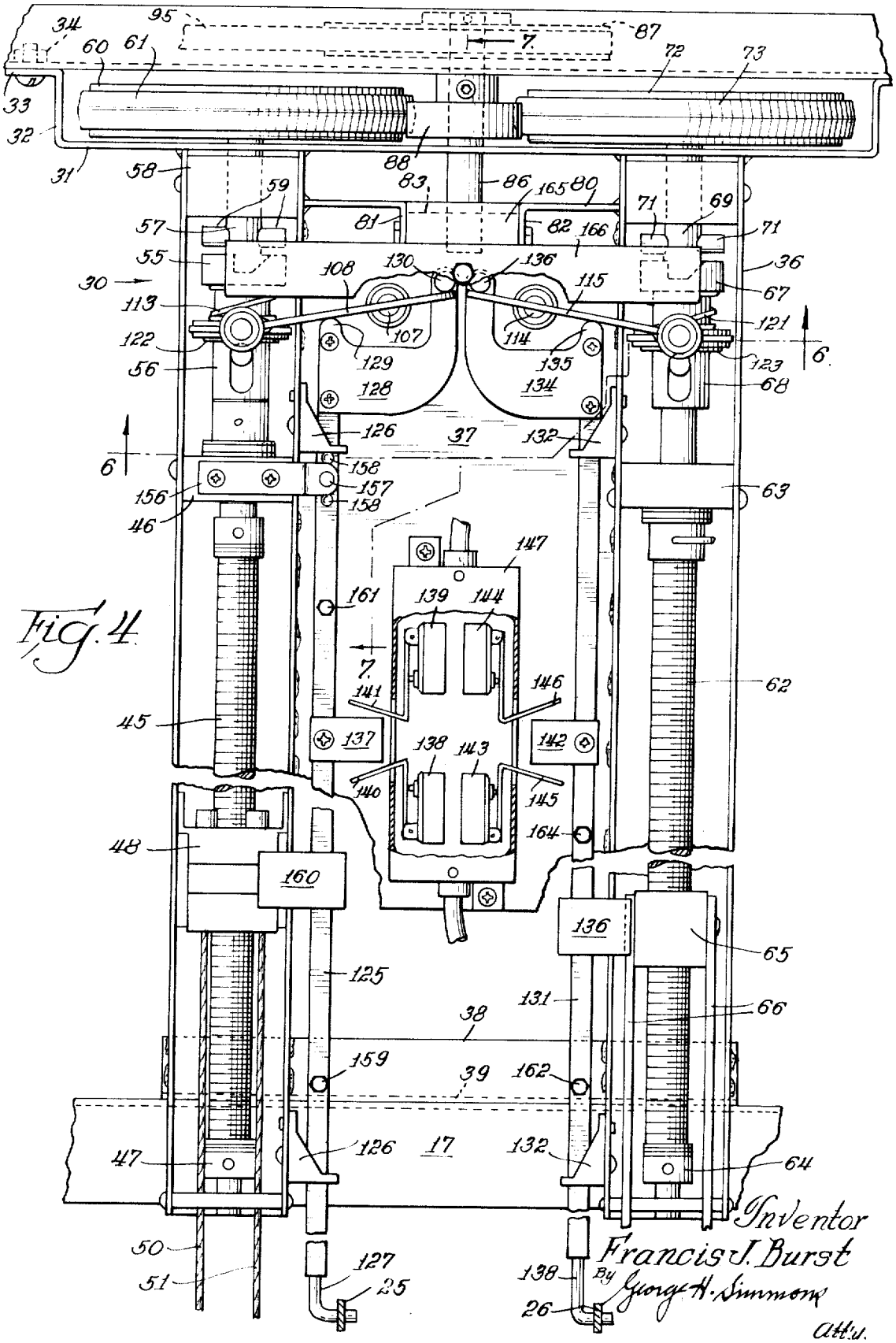
FIG. 4 is a plan view of the power unit with the mechanisms thereof in neutral position.
Figure 7:
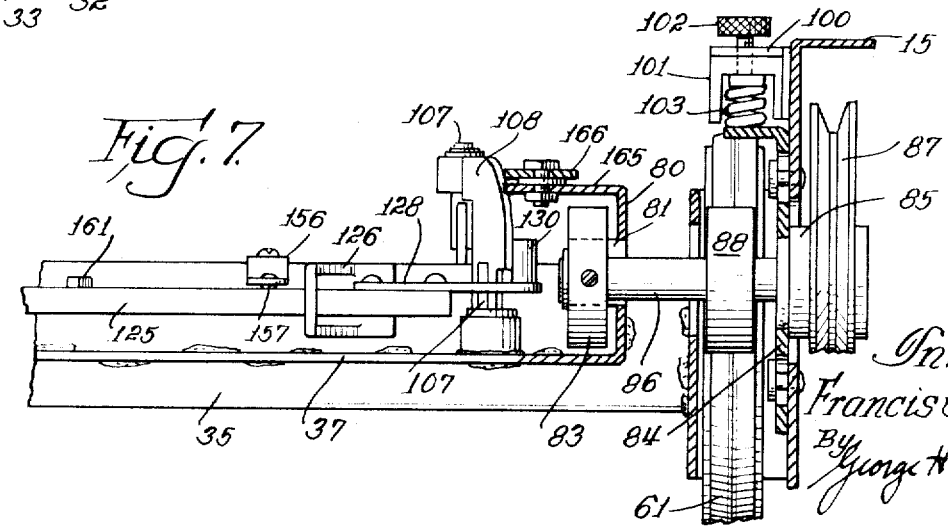
FIG. 7 is a side elevational view taken substantially along the line 77 of FIG. 5.

As will be seen in FIGS. 4 and 7, base plate 37 contains an upstanding flange 80 adjacent the mounting bracket 31. Projecting from this flange are spaced-apart bearing ears 81 and 82 in which a bearing 83 is supported for limited movement around a horizontal axis. As will be seen in FIG. 7, an L-shaped plate 84 is attached to the web of the cross channel 15 by studs projecting through vertically disposed slots in the plate. Attached to this plate is a bearing 85. A shaft 86 is journaled in bearings 82 and 85 and projects into the channel 15. A pulley wheel 87 is attached to the end of shaft 86. A friction drive wheel 38 is mounted upon the shaft 86 between bearings 82 and 85.

Figure 3:
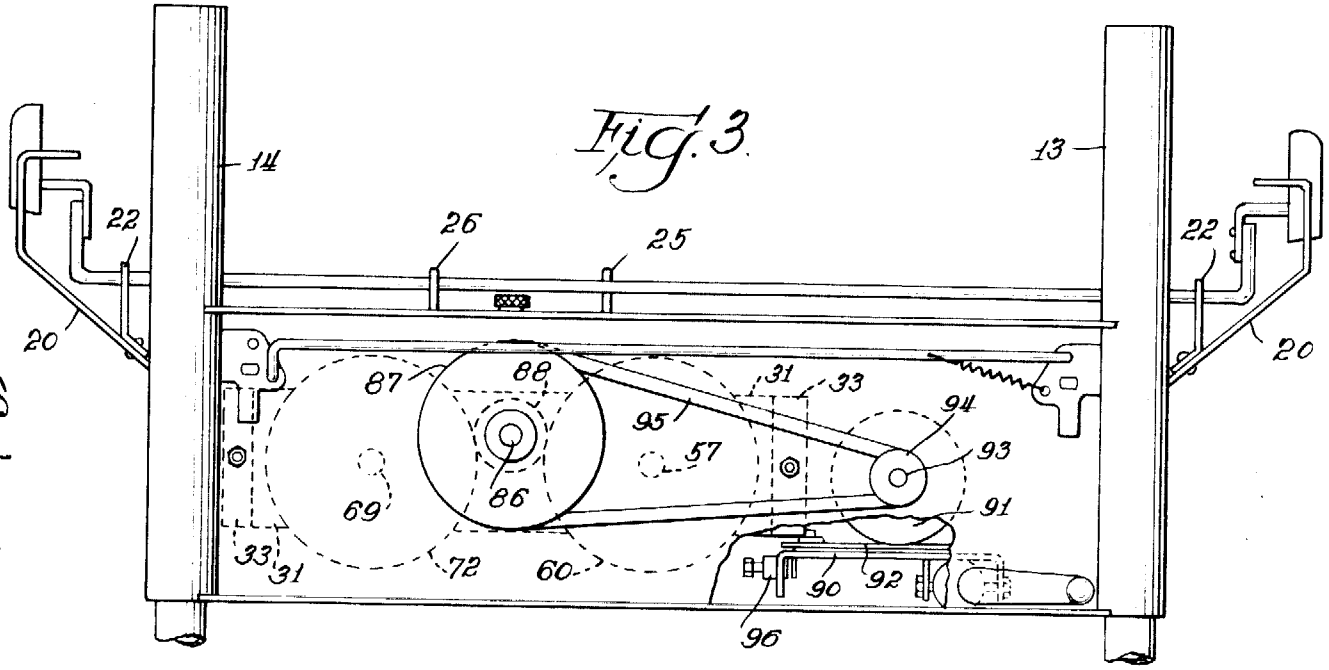
FIG. 3 is an end elevational view of the bed drawn to an enlarged scale.

As will be seen best in FIGS. 1 and 3, a motor-mounting plate 90 is attached to the web of the cross channel 15. The base 92 of an electric motor 91 is supported upon this plate by studs that project through slots in the base. The shaft 93 of the motor 92 projects through a perforation in the web of channel 15 and a motor pulley 94 is fixed upon the end of shaft 93. A belt 95 encircles the pulley wheels 87 and 94 to establish a driving connection therebetween. To maintain a desired tension upon the belt a tension adjusting device 96 is mounted upon the motor mount 90 and bears against the motor base 92.

Friction drive wheel 88 engages the friction facings on the two discs to drive the same as the drive wheel is rotated. As will be seen best in FIG. 3, the axis of the shaft 86 is located slightly above the axes of friction disc shafts 57 and 69. To maintain a desired pressure between the driving wheel 88 and the discs a bracket 100 is fixed upon the channel 15 and a counterbored block 101 is attached thereto. An adjusting screw 102 is threaded through the bracket 100 and block 101 and bears against a compression spring 103 which bears against the upper arm of the L-shaped bracket 84 through a suitable bearing button. By rotating the screw 102 the spring 103 may be compressed to increase the pressure between the driving wheel and friction discs. In this manner, a predetermined pressure can be maintained and slippage of the driving wheel upon the discs thereby prevented.

Fixed upon base plate 37 in suitable manner such as by welding are pivot bosses 105 and 106. A pivot pin 107 projects into the boss 105 and is attached to a clutch arm 108 in convenient manner such as by welding. A boss 109 is attached to the distal end of arm 108.

A yoke pin 110 is journaled in the boss 109 and attached to yoke 111. Mounted upon the hub 56 of the clutch mechanism is a spool 112 containing a groove into which the yoke 111 is fitted. A spring 113 encircles the hub 56 and the bears against the spool 112 and element 55 of the clutch.

In a similar manner, a pivot pin 144 is journaled in boss 106 and attached to clutch arm 115 upon the distal end of which a boss 116 is fixed. A yoke pin 117 is journaled in boss 116 and attached to yoke 118 which fits into a groove in a spool 119 on the hub 68 of the clutch assembly. A spring 121 encircles this hub and bears against the spool 119 and a clutch element 67.

Normally spool 112 is held against a snap ring 122 that is fitted in a groove in hub 56 by spring 113 and spool 119 is held against a snap ring 123 that is fitted in a groove in hub 68 by spring 121.

To provide for control of the bed by a patient therein, I have mounted a hi-low control rod 125 in brackets 126 fixed upon the screw channel 35. Control rod 125 is preferably rectangular in cross section and bushings 126 are preferably formed from a low resistance plastic such as nylon. The link 127 connects control rod 125 to link 25 on the hi-low transverse rod 23. It will be apparent that rotation of rod 23 in one direction moves the control rod 125 longitudinally in a corresponding direction and vice versa.

Fixed upon the end of control rod 125 is an actuator plate 128 which contains an ear 129 that bears against the clutch arm 108 at a point between the pivot pin 127 and the boss 109. To this arrangement movement of the control rod 125 towards the foot end of the bed rotates the actuator arm to move the spool 112 towards the clutch element 55 thereby compressing the spring 113. When the pins 59 on the shaft 57 register with end grooves in clutch element 55, the element moves into engagement with these pins to establish a driving connection between friction disc 59 and screw shaft 45. Also mounted upon the actuator plate 128 is a pin 130 which engages the clutch arm 108 at a point on the side of the pivot pin 107 opposite the boss 109. Through this arrangement movement of the control rod away from the foot of the bed rotates the clutch arm 108 to tension spring 113 in the foregoing manner.

To provide for control of the head section of the spring frame, I have mounted a control rod 131 in bushings 132 which are fixed upon the screw channel 36. A link 133 connects rod 131 to the link 126 on the head control transverse rod 24. Fixed upon the end of control rod 131 is an actuator plate 134 which has an ear 135 that bears against the clutch arm 115 between the pivotal support of that arm and the boss 116 carried thereby and the plate 134 also has a pin 136 which engages the plate 115 on the side of the pivotal support of that plate opposite that containing the boss 116. Through this arrangement movement of the control rod 131 in either direction operates the clutch in the above manner.

The electrical circuit of the motor is controlled by switches 138, 139, 143 and 144. Preferably, these switches are momentary snap action single-pole switches of which a number are available on the open market. Arm 140 of switch 138 and arm 141 of switch 139 extend to opposite sides of a cam 137 carried upon the control rod 125. In a similar manner, arm 145 of switch 143 and arm 146 of switch 144 are disposed upon opposite sides of a cam 142 carried upon a control rod 131.

Figure 8:
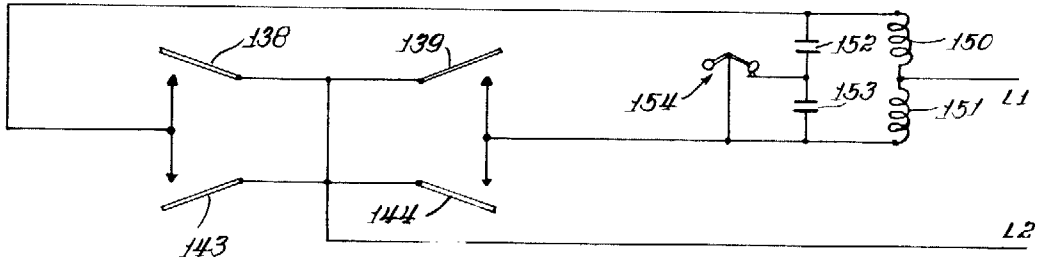
FIG. 8 is a schematic diagram of the electrical circuit of the bed.

As will be seen in FIG. 8, the mainsprings of switches 138, 139, 143 and 144 are connected together and connected to line L2 of a source of commercial power. Make contacts of switches 138 and 143 are connected together and to a junction of a motor winding 150 and condenser 152. Motor winding 151 is connected to winding 150 and the other line L1 of the source of commercial current is connected to this junction. A second condenser 153 is connected to condenser 152 and is normally bypassed by a centrifugal switch 154. Through this arrangement, closing of either switch 138 or 133 extends line L2 through winding 150 to line L1 with an auxiliary circuit extending through condenser 152 and centrifugal switch 154 and thence through the winding 151 to L1. The winding 150 is thus the main winding and the winding 151 the auxiliary winding and the motor operates in one direction. As soon as the motor gets up the speed, centrifugal switch 154 opens to connect condenser 153 in series with condenser 152.

When either switch 139 or 144 is operated, line L2 is connected through winding 151 to line L1 with an auxiliary circuit through the centrifugal switch 154 and condenser 152 and winding 150 to L1. The motor operates in the opposite direction.

Figure 5:
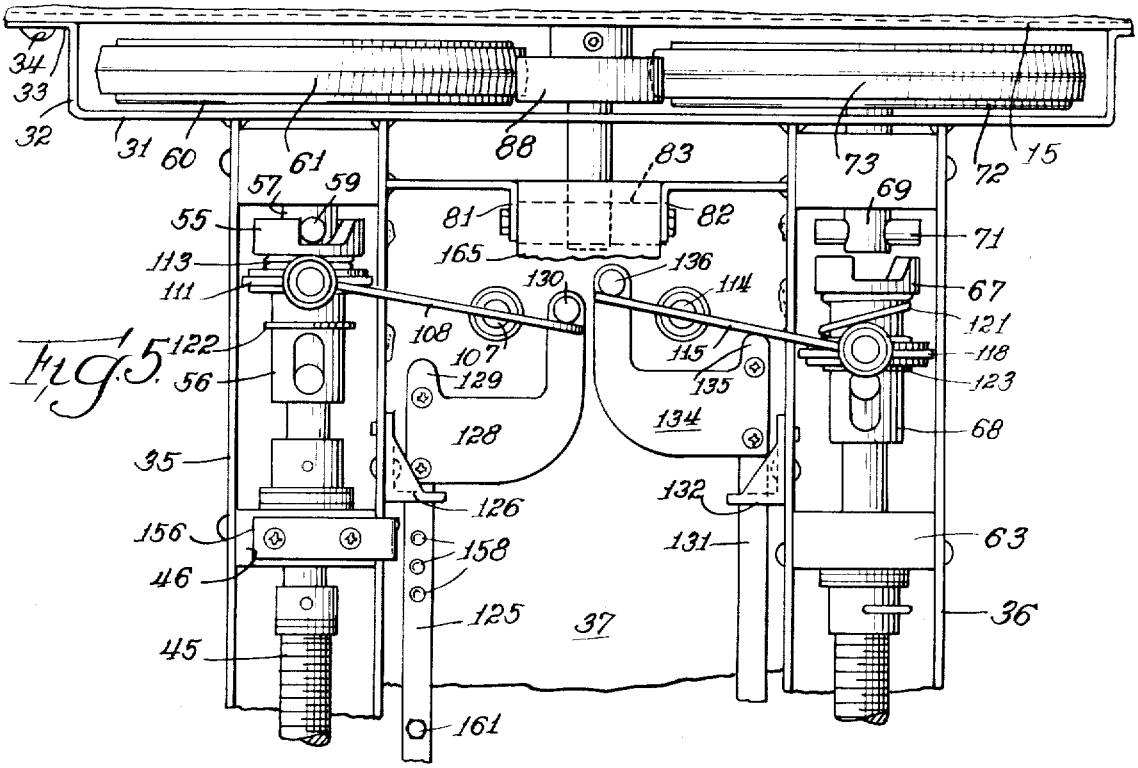
FIG. 5 is a fragmentary plan view of the power unit with the hi-low clutch moved into driving position.

To aid in the holding the control rod 125 in operated position during a hi-low operation of the bed, I have provided an arm 156 that is mounted on the bearing 46 and carries at its distal end a spring pressed button 157 which engages indentations 158. FIG. 5, in each of the three positions in which the control arm may be located.

Limit positions of the bed are determined and maintained in the normal manner. When control rod 125 is moved towards the foot end of the bed, nut 48 is moved towards the head end of the bed to lower the bed on its supporting posts. A bar 160 carried on nut 48 is moved into engagement with a pin 159 on control rod 125 and the nut moves the rod back to normal to stop the motor. When the nut 48 is moving towards the foot end of the bed bar 160 engages pin 161 to stop the motor. In a similar manner bar 163 on nut 65 engages pins 162 and 164 on control rod 131 to establish limit positions.

Operation of the limit position control, in addition to stopping the motor, moves the spool 112, from the position shown in FIG. 4, into engagement with snap ring 122. Compression of spring 113 is thus relieved but the clutch element is not moved, rather it remains in driving engagement with pins 59. Thus, it will be seen that the driving connection established by a clutch remains intact upon restoration of the control rod that established the connection.

To prevent establishment of simultaneous driving connections an interlock is provided. As will be seen best in FIGS. 6 and 7, a mounting ear 165 extends from the top of flange 80 and is disposed parallel to base plate 37. Pivotally mounted upon ear 165 is an interlock bar 166 one end of which terminates adjacent boss 109 on yoke 111 and the other end terminates adjacent boss 116 on yoke 118.

When a patient in the bed operates control rod 131 to move yoke 118 away from snap ring 123, bar 166 is rotated on its pivot to move clutch element 55 out of engagement with pins 59 prior to movement of clutch element 67 into engagement with pins 71. When clutch element 67 is in driving engagement with pins 71, operation of hi-low control rod 125 causes interlock bar 166 to rotate in the opposite direction to move element 67 out of engagement with pins 71 before element 55 engages pins 59. The establishment of simultaneous driving connections is thus definitely prevented.

To guard against the entrance of lint and other extraneous matter into the power unit, a dust cover 124, FIGS. 1 and 2, is provided. This cover includes a portion covering the motor. The cross channels at the head and foot ends of the bed are equipped with the usual covers to complete the protection of the power mechanism.

From the foregoing, it will be apparent that the power unit of the present invention possesses many advantages. Since the power unit is a self-contained structure, it can be assembled on a bench, and the unit then secured in the frame of the bed in a convenient manner. The assembly is completed by simple operations that can be performed at low cost. As a result, the cost of the bed is low enough to render it available in installations where manually operated beds have been used heretofore. Since selection of the operation to be performed and the starting of that operation are made by the patient in the bed, less attention to the patient by the hospital attendants is required.

The power unit is capable of operating for a long period of time without maintenance and should replacement of the belt become necessary, this can be done without disturbing the main assembly of the unit.

I claim:

1. A power unit for a hi-low hospital bed that has a spring frame which includes a seat section to which a head section is pivotally connected, has a pair of transverse control rods journaled in said seat section and available to a patient in the bed and has an underframe that includes a cross channel at the foot end of the bed, said unit comprising:

(a) a power unit framework consisting of a mounting bracket fixed upon said cross channel and having a center section spaced therefrom, a pair of spaced-apart screw channels fixed to said mounting plate on the side thereof away from said cross channel, a base plate fixed between said screw channels adjacent said mounting plate, and a tie plate fixed between said screw channels adjacent the distal ends thereof;

(b) a screw shaft journaled in each screw channel by bearings fixed in the channel;

(c) a friction disc associated with each screw shaft positioned between the mounting bracket and the cross channel and fixed upon a shaft journaled in the screw channel in axial alignment with the screw shaft;

(d) a drive wheel frictionally engaging both of said friction discs is fixed upon a drive shaft that is journaled in a first bearing supported on the base plate and in a second bearing supporting upon the web of the cross channel through which web the shaft extends;

(e) an electric motor mounted on a motor mount fixed upon the web of the cross channel with the motor shaft extending through a perforation in that web;

(f) a belt encircling sheaves fixed on the motor and drive shafts to establish a driving connection for the drive wheel;

(g) clutch means including a pair of clutch mechanisms for establishing driving connections between said discs and screw shafts;

(h) means operable by a patient in the bed for operating said clutches into driving positions; and (i) an interlock for preventing simultaneous movement of said clutch mechanisms into driving positions.

2. A power unit as specified in claim 1 in which said first bearing is supported for limited movement around a horizontal axis and the second bearing is mounted upon an L-shaped plate mounted upon the web of the cross channel for limited vertical movement and in which a spring pressed button engages the L-plate and urges and maintains the drive wheel against the friction discs under predetermined pressure.

3. A power unit as specified in claim 1 in which each clutch mechanism includes diametrically opposed pins on the end of said friction disc shaft, a clutch element having a hub telescoped over the screw shaft and held against rotation thereon while capable of axial movements thereon, said clutch element containing radial slots into which said pins are positioned by axial movement of the elements to establish a driving connection between the friction disc and screw shaft.

4. A power unit as specified in claim 3 in which there is a clutch arm pivotally supported upon the base plate, a boss fixed upon said arm, a yoke, a pin fixed upon said yoke and journaled in said boss, a spool positioned upon the hub of the clutch element and containing a groove into which said yoke fits, a spring encircling said hub and engaging said element and said spool, rotation of said arm moving said spool axially on the hub to compress said spring and thereby move said clutch element into driving engagement with said pins.

5. A power unit as specified in claim 4 in which the patient operable means includes a pair of longitudinal control rods supported in said framework for longitudinal movements, link means connecting each longitudinal rod to one of said transverse rods, and clutch-operating means fixed upon each longitudinal rod.

6. A power unit as specified in claim 5 in which the clutch-operating means includes an actuator plate fixed upon the control rod and engaging the clutch arm at a point between the pivotal support of that arm and the boss on said arm, said actuator plate having a pin that engages the clutch arm at a point on the arm on the side of the pivotal support of the arm opposite the point of engagement of the plate with that arm, so that movement of the control rod and actuator plate from neutral in either direction moves the clutch element into driving engagement with said pins.

7. A power unit as specified in claim 5 in which a pair of momentary single-pole snap switches are associated with each longitudinal control rod and in which a cam fixed upon the rod is positioned midway between the operating arms of said switches when the rod is in neutral position, said cam operating one of said switches as the rod is moved from neutral in one direction and operating the other one of said switches as the rod is moved from neutral in the opposite direction.

8. A power unit as specified in claim 4 in which the interlock includes a bar pivotally mounted upon said base plate and extending into juxtaposition to said clutch arm bosses, said bar being rotated on its pivot by movement of one of said clutch mechanisms into driving engagement with the pins associated with it, to move the other clutch mechanism out of engagement with the pins associated with it.

*9. A power unit for a hi-low hospital bed that has a spring frame which includes a seat section to which a head section is pivotally connected, a pair of transverse control rods journaled in said seat section and available to a patient in the bed, and an underframe that includes a cross channel at the foot end of the bed, said unit comprising:*

*(a) a power unit framework fixed on said cross channel;*

*(b) a pair of screw shafts journaled in said framework, one of said screw shafts adapted to pivot said head section, and the other adapted to vertically position said spring frame;*

*(c) a friction disc associated with each screw shaft;*

*(d) a drive wheel frictionally engaging both of said friction discs;*

*(e) an electric motor for rotating said wheel and discs;*

*(f) clutch means including a pair of clutch mechanisms for establishing driving connections between said discs and screw shafts;*

*(g) means including a control rod operable by a patient in the bed for operating said clutches into driving positions and for selectively actuating said motor in forward or reverse direction; and*

*(h) an interlock for preventing simultaneous movement of said clutch mechanisms into driving positions.*

*10. A power unit for a hospital bed comprising a support frame mounted upon telescopic legs and carrying a spring frame having head section pivotally connected to a seat section, a pair of spaced apart screw shafts journaled in said support frame, each having a translatable nut thereon, one of said translatable nuts having connection to said pivotal head section for pivoting same and the other having connections to said telescopic legs for vertically positioning the support frame, the improvement comprising:*

*(a) friction discs rotatably carried by a framework mounted on said support frame in axial alignment with said screw shafts;*

*(b) a pair of clutch means for selectively establishing driving connections between said friction discs and said screw shafts;*

*(c) a drive wheel rotatably carried by said framework and frictionally driving both of said friction discs simultaneously;*

*(d) reversible electric motor carried by said framework and driving said drive wheel; and switch means located between said screw shafts for actuating said motor;*

*(e) an elongated control rod associated with each of said screw shafts and having a neutral position, each of said control rods having a cam for actuating said switch means and said motor in a forward or reverse direction upon movement of the control rods to a first or second position from neutral and actuator means at one end of each control rod for mechanically engaging one of said clutch means upon movement of the associated control rod to either said first or second position.*

*11. A hospital bed as recited in claim 10 in which each translatable nut and control rod has cooperative means thereon for returning the control rods to the neutral position after movement to said first or second position when the translatable nut has reached the limit of its travel.*

*12. A hospital bed as recited in claim 10 in which a pivotal interlock precludes simultaneous engagement of both clutch means.*

*13. A hospital bed as recited in claim 10 in which the actuator means for mechanically engaging the clutch means of each screw shaft comprises a lever pivotally connected to the clutch means and pivotally supported upon said framework, pivotal movement of said lever in either direction causing engagement of said clutch means, and an actuator plate connected to each control rod and engageable with said levers to pivot said lever in said clutch engaging direction upon movement of said control rod to either of said first or second position.*

*14. A hospital bed as recited in claim 13 in which an interlocking lever is pivotally supported intermediate said clutch means and includes opposite ends engageable with said levers; movement of one of said clutch means into engagement causing said interlocking lever to disengage the other of said clutch means.*

*15. A power unit for a hospital bed comprising a support frame mounted upon telescopic legs and carrying a spring frame having head section pivotally connected to a seat section, a pair of spaced apart screw shafts journaled in said support frame, each having a translatable nut thereon, one of said translatable nuts having connection to said pivotal head section for pivoting same and the other having connections to said telescopic legs for vertically positioning the support frame, friction discs rotatably carried by a framework mounted on said support frame in axial alignment with each screw shaft, a pair of clutch means for selectively establishing driving connections between said friction discs and screw shafts, a drive wheel rotatably carried by said framework and frictionally driving both of said friction discs simulta-*

*neously, reversible electric motor carried by said framework and driving said drive wheel, the improvement comprising:*

(*a*) *switch means located between said screw shafts for actuating said motor;*

(*b*) *an elongated control rod associated with each of said screw shafts and having a neutral position, each of said control rods having a cam for actuating said switch means and said motor in a forward or reverse direction upon movement of the control rods to a first or second position from neutral; and*

(*c*) *actuator means at one end of each control rod for mechanically engaging one of said clutch means upon movement of the associated control rod to either said first or second position.*

References Cited

The following references, cited by the Examiner, are of record in the patented file of this patent or the original patent.

UNITED STATES PATENTS

| | | | |
|---|---|---|---|
| 2,913,300 | 11/1959 | Darnell et al. | 5—68 |
| 3,198,891 | 8/1965 | Burst et al. | 5—68 |
| 3,246,540 | 4/1966 | Pickles et al. | 5—68 X |
| 3,436,769 | 4/1969 | Burst | 5—67 |

CASMIR A. NUNBERG, Primary Examiner

U.S. Cl. X.R.

5—63; 74—202